Patented Sept. 19, 1922.

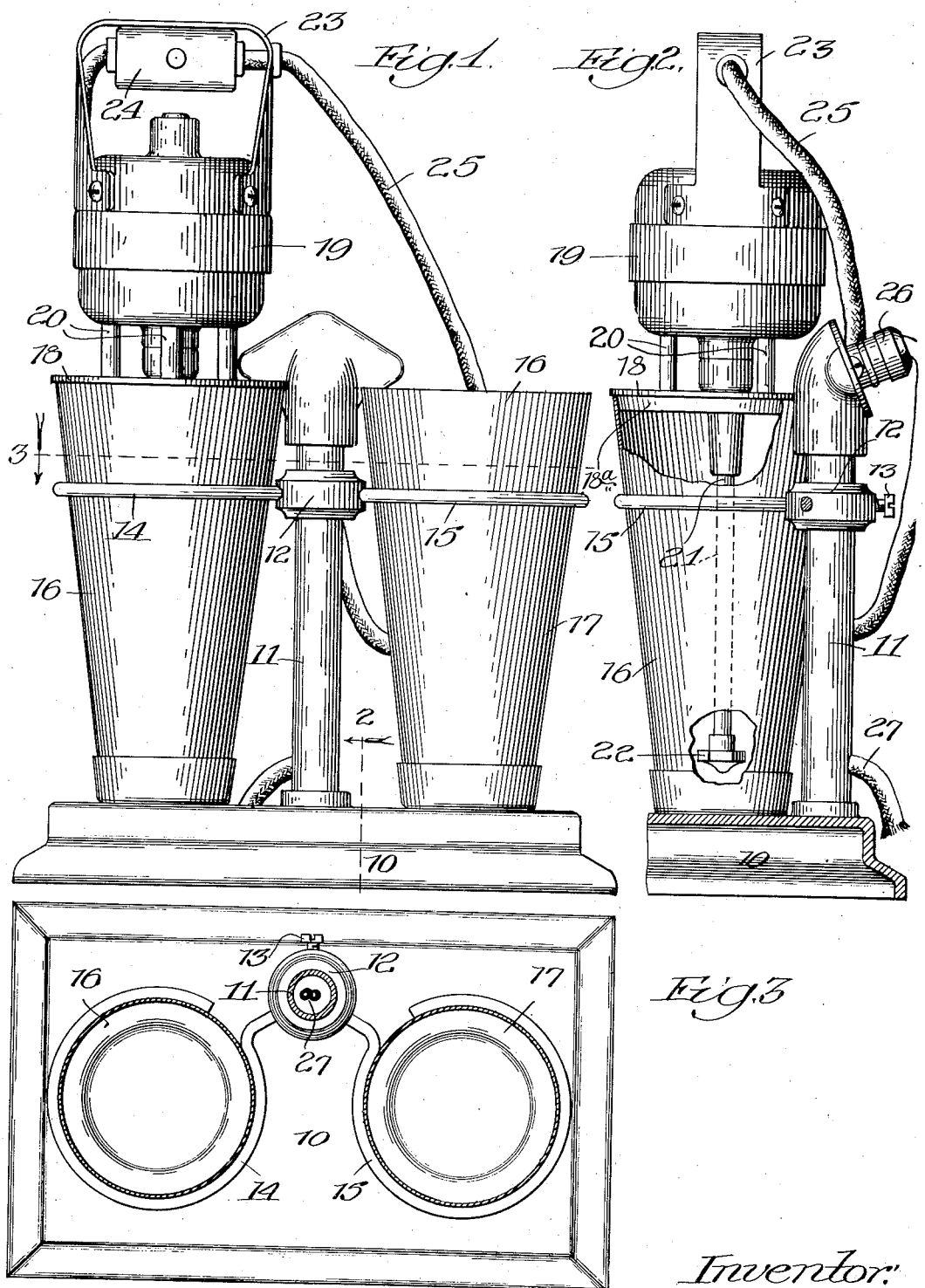

1,429,747

UNITED STATES PATENT OFFICE.

WILLARD LYNGAR, OF CHICAGO, ILLINOIS, ASSIGNOR TO LYNGAR SPECIALTY CO., OF CHICAGO, ILLINOIS, A CORPORATION OF ILLINOIS.

DRINK MIXER.

Application filed September 8, 1921. Serial No. 499,196.

*To all whom it may concern:*

Be it known that I, WILLARD LYNGAR, a citizen of the United States, residing at Chicago, in the county of Cook and State of Illinois, have invented a new and useful Improvement in Drink Mixers, of which the following is a specification.

This invention relates to drink mixers and is fully described in the following specification and shown in the accompanying drawings, in which—

Fig. 1 is a front elevation of a drink mixer;

Fig. 2 is a partial vertical section on line 2 of Fig. 1; and

Fig. 3 is a plan view and partial section on the line 3 of Fig. 1.

This device consists of a base 10 having a hollow standard 11 secured thereto. A collar 12 is adjustably held upon the standard 11 by means of an adjusting screw 13 and carries two holders 14 and 15. These holders serve to hold containers 16 and 17 which rest upon the flat base 10.

A cover 18 having a slightly conical bottom 18ª as shown in Fig. 2 rests upon the top of either of the containers 16 or 17 and carries an electric motor 19 upon a plurality of legs 20. This motor has a vertical shaft 21 which extends down into the container and has an agitator 22 secured upon its lower end.

The handle 23 is secured to the motor 19 and a push-through electric switch 24 is preferably secured to this handle, the switch being connected to the motor by suitable wiring. A flexible wire 25 connects the switch 24 with a connection 26 on the back of the standard 11 which in turn is connected with any suitable source of electric current by means of the wire 27.

Assuming that both the containers 16 and 17 are empty, the method of operating this device is as follows. The container 17 is removed and the drink to be mixed is poured into it and the container is set back in the holder 15. The cover 18 is then raised and placed over the container 17 with the agitator 22 in the container as illustrated. The switch 24 is then thrown so as to start the electric motor, thereby causing the agitator 22 to be rotated and the drink to be mixed.

As soon as the mixing operation is completed the switch 24 is thrown to the "off" position, the cover removed and the container 17 lifted out of the holder and the drink removed from the container.

Where this drink mixer is used for mixing only a single drink, such as malted milk, the cover 18 may be moved to the other container without washing and though it remains idle for some little time, no dirt or flies are able to get to the parts that come in contact with the drink. The used container is then washed and then returned to the holder 15. Where this mixture is used quite frequently the next drink to be mixed may be placed in the second container while the first is being mixed and as soon as the mixing operation is completed on the first drink the cover may be moved immediately to the other container.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A drink mixer comprising a base, a standard secured thereto, a plurality of holders carried by said standard, two similar containers removably held within the holders and resting upon the base, a cover adapted to be moved bodily and placed upon any one of said containers and closely fitting the tops of said containers, a motor supported by said cover, an agitator driven by the motor and extending into the container, and a flexible connection for said motor, so that the same parts of the cover are always enclosed within the container when placed thereon.

2. A drink mixer comprising a base, a standard secured thereto, a plurality of holders carried by said standard, two similar containers removably held within the holders and resting upon the base, a cover adapted to be moved bodily and placed upon any one of said containers and closely fitting the tops of said containers, a motor supported by said cover, an agitator driven by the motor and extending into the container, a flexible connection for said motor so that the same parts of the cover are always enclosed within the container when placed thereon, a handle for said motor and a snap switch thereon in series with said motor.

WILLARD LYNGAR.